United States Patent [19]
Tucker et al.

[11] 3,879,563
[45] Apr. 22, 1975

[54] REFRIGERATED BISCUIT DOUGH

[75] Inventors: Don R. Tucker, Golden Valley; Richard E. Willits, Edina, both of Minn.

[73] Assignee: The Pillsbury Company, Minneapolis, Minn.

[22] Filed: Apr. 2, 1973

[21] Appl. No.: 347,099

[52] U.S. Cl. ............... 426/128; 426/152; 426/153; 426/345
[51] Int. Cl............................................ A21d 13/00
[58] Field of Search ........... 426/128, 152, 153, 345; 99/90 R

[56] References Cited
UNITED STATES PATENTS

| | | | |
|---|---|---|---|
| 2,982,662 | 5/1961 | Cochran et al. | 426/345 X |
| 3,297,449 | 1/1967 | Baker et al. | 426/153 X |
| 3,428,461 | 2/1969 | Hatton et al. | 426/152 |

*Primary Examiner*—S. Leon Bashore
*Assistant Examiner*—Marc L. Caroff
*Attorney, Agent, or Firm*—Michael D. Ellwein; James V. Harmon

[57] ABSTRACT

A refrigerated biscuit dough that is storage stable at refrigerated temperatures for at least 45 days is provided. The baked biscuits have a physical appearance, texture, and taste closely resembling that of homemade biscuits. The dough is comprised of a low protein farinaceous material, shortening in both chip and plastic form, water and chemical leavening. The dough is mixed only long enough to provide machinability and dough stability during storage.

31 Claims, No Drawings

REFRIGERATED BISCUIT DOUGH

BACKGROUND OF THE INVENTION

This invention relates to packaged biscuit dough. The dough is specially formulated to provide stability during refrigerated storage and, when baked, to provide a biscuit closely resembling rolled homemade biscuits.

Although many recipes for homemade biscuits exist, the following recipe is typical of "high fat" rolled biscuit recipes.

| INGREDIENTS | AMOUNT |
| --- | --- |
| Self-rising flour | 2 cups |
| Plastic shortening | ½ cup |
| Milk (if buttermilk is used, add ¼ teaspoon of soda) | ¾ cup |

The flour and shortening are cut together until the mixture resembles coarse crumbs. Then the liquid is added and the mixture is stirred until the dough forms a ball. The dough is kneaded on a floured surface, rolled to the proper thickness (about five-eighths inch), cut and baked.

The dough is characterized by being short and practically nonextensible. The dough is essentially undeveloped because of the minimum amount of work used in mixing it. In very general terms, dough development describes the phenomenon by which a loose mass of flour particles, when admixed with water, becomes a cohesive resilient body of dough. As mixing is continued, the gluten protein forms a resiliently extensible matrix. This matrix is capable of entrapping and retaining leavening gas bubbles and is the initial support for the expanding dough structure during baking. An undeveloped dough, by contrast, is crumbly, nonextensible, and does not retain leavening gas as well as developed doughs.

Homemade biscuits have a distinct physical appearance. They are erect, with nearly vertical sidewalls and flat tops. In many cases, the tops are canted. A web-like break generally appears in the sidewalls of each of the biscuits and extends around about two-thirds of the circumference of the biscuit. A distinct top edge is generally present which separates the top from the sidewall. The exterior surface, excluding the bottom, is uneven and irregular. The top of the biscuit is a mottled, golden brown color while the sides remain creamy white.

The crust of homemade biscuits has a slightly blistered appearance and is flakey, much like pie crust. The interior texture is coarse-grained, crumbly and friable, more cake-like than bread-like. No striations are visible in the interior of these biscuits.

Since the inception of the refrigerated dough business in the late 1920's, attempts have been made to obtain baked biscuits similar to homemade biscuits with commercial refrigerated dough. These attempts have met with varying degrees of commercial acceptance but none have been successful in matching the physical appearance, texture, and taste of homemade biscuits.

Refrigerated biscuit dough has traditionally been packed in fiber containers having vent holes (U.S. Pat. No. 1,811,772) or other means for gas to escape therefrom (U.S. Pat. No. 2,478,618). As the dough is proofed, carbon dioxide is generated which expands the dough and drives the oxygen out of the container. The refrigerated dough industry has required that fully developed doughs be packed in these containers because of their ability to retain leavening gas. The expanding dough will seal the container and retain an internal gas pressure. An effective seal and means for pressure retention are necessary to provide sufficient shelf life for the product to move through commercial channels (U.S. Pat. Nos. 2,478,618 and 3,524,401).

Dough development was also important in providing necessary dough machinability. The dough had to be sufficiently extensible and elastic so that a continuous dough sheet could be formed and moved along a processing line. To attain this type of dough, hard wheat flour has generally been used because of the high gluten content and more extensible developed dough attainable therefrom (see U.S. Pat. No. 3,297,449). The amount of fat utilized has also generally been restricted to improve machinability of the dough (see U.S. Pat. Nos. 3,524,401 and 2,942,988).

Developed biscuit doughs such as are commercially available, when baked, have a significantly different physical appearance and texture than the traditional homemade biscuits and have a metallic, "canned biscuit" flavor. These biscuits, when baked, spread outwardly and have bulging barrel-shaped sidewalls and a domed or humped upper surface. Normally, no edge is apparent between the top surface and sidewalls. The entire top surface and large portions of the sidewalls are smooth and without breaks and irregularities. Nearly the entire surface of the biscuit is a foxy red color as contrasted to the golden brown of homemade biscuits.

The crust of these biscuits is rather leathery and separates from the interior in large, continuous pieces. The interior texture is bread-like.

Attempts have been made to improve the interior texture of biscuits by layering shortening into the dough (see U.S. Pat. No. 3,142,573). This technique provides a more tender product; however, the crumb structure remains more bread-like than cake-like and striations are visible running horizontally across the interior. The external physical appearance of the biscuit remains the same.

Another technique for improving texture involves "blitzing" shortening into dough. In this method, marble-sized chunks of shortening are mixed into the dough to obtain improvements in texture. This same general technique is used when fat chips are introduced into the dough (see U.S. Pat. No. 3,582,353).

Although these techniques improved the texture of biscuits baked from developed doughs somewhat, it still remained bread-like rather than cakelike and the physical appearance of the biscuit continued to differ greatly from that of homemade biscuits.

SUMMARY OF THE INVENTION

The primary object of this invention is to provide a biscuit dough packed in a refrigerated dough container that is storage stable under refrigerated storage conditions for at least 45 days and, when baked, will provide a biscuit that closely resembles a homemade biscuit in physical appearance, texture and taste. To obtain this biscuit dough, the following components are combined: 43 parts to 53 parts farinaceous material containing from 8.5 to 10.5 percent protein; 12 parts to 21 parts shortening of which 6 parts to 11 parts are plastic shortening and 6 parts to 12 parts are shortening chips; sufficient water to form a machinable dough; and sufficient chemical leavening to expand the dough and thereby seal the refrigerated dough container. Preferably, salt, sugar, and milk solids are added to this formulation to improve flavor and enhance storage stability. To obtain the proper texture, it is important that the components be only minimally mixed to provide a short, nonextensible dough. Prior to packing, the dough is preferably layered to enhance storage stability as exemplified by the physical characteristics of the baked product.

DESCRIPTION OF THE PREFERRED EMBODIMENTS

This invention relates to refrigerated biscuit dough which, when formed into a dough piece and baked, has a physical appearance, texture, and taste closely resembling that of homemade biscuits. To meet these criteria, the baked product must have essentially vertical sidewalls and flat tops. A web-like break must appear in a portion of the sidewall and the sidewall and top should be separated by a distinct edge. The exterior top surface of the biscuit must be irregular. The color of the top should be a mottled, golden brown or light foxy red and the sidewalls should remain creamy white. The crust should be flakey and slightly blistered.

The interior texture must be coarse grained, more cake-like than bread-like. Preferably, the biscuit is crumbly and friable with no striations being visible.

The flavor of biscuits is generally characterized as bland. However, if the texture, and to a lesser degree the physical appearance, are as generally described above, subjective comments on flavor are generally favorable. If texture and physical appearance are not within these bounds, subjective comments on flavor are less favorable.

In addition to these baked attributes, the dough must be sufficiently machinable to be processed through commercial dough lines. The dough, packaged in refrigerated dough containers, must also have a shelf life as exemplified by the baked product characteristics of at least 45 days and preferably 60 days.

This biscuit dough is comprised of the following critical components in parts by weight: 43 parts to 53 parts farinaceous material containing from 8.5 to 10.5 percent wheat protein; from 12 parts to 21 parts shortening wherein from 6 parts to 11 parts of the total shortening is plastic shortening and from 6 parts to 12 parts of the total shortening is in the form of chips; sufficient water to provide a machinable dough; and sufficient chemical leavening to seal the refrigerated dough container and provide a positive gas pressure therein. These critical components must be minimally mixed and the dough preferably is formed into at least four dough layers to attain the final product functional limitations.

It should be understood that the characteristics of the biscuit dough, and the baked biscuit, are not attributable to any one component. Instead, these product characteristics are the result of interactions among all of the required components and are further influenced by the critical processing conditions set forth hereinafter.

Farinaceous Material

The biscuits of this invention contain from 43 parts to 53 parts, preferably 46 parts to 49 parts, farinaceous material having a wheat protein level of from 8.5 to 10.5 percent, preferably from 9 to 10 percent. The farinaceous material is comprised of starch and protein from the same or different sources.

The wheat protein must be primarily insoluble protein, preferably obtained from soft wheat. Some of these proteins, in combination with other flour components, form a complex generally referred to as gluten. The gluten, during mixing, forms a resilient matrix which is responsible for the cohesive nature of dough formed from wheat. The relationship between wheat protein and gluten in various flours is identified in *Cereal Chemistry*, Vol. 33, p. 118 (which is hereby incorporated by reference). In flour, the total weight of the gluten (protein and other components) is generally from 85 to 99 percent of the total weight of protein.

The protein or gluten quality of soft wheat flour apparently helps to provide a baked biscuit texture which is more tender, friable and crumbly than that obtained when hard wheat gluten is used. Soft wheat gluten forms a structure quickly during mixing but does not create an extensible dough. Instead, the dough is less elastic and shorter than doughs prepared from doughs of hard wheat flour.

At least 8.5 percent of the specified protein must be present in the farinaceous material. If less protein is present, the volume of the baked biscuit diminishes, the sidewalls seal and the biscuits are generally dome shaped or humped. When this happens, a portion of the top surface is generally white and cracked and the sidewalls are brown. The crumb structure of such low protein biscuits is dense, doughy and lacking in shortness. Additionally, the shelf life of the product as exemplified by baked product characteristics is less than 45 days and the biscuits have a bitter taste.

If the farinaceous material contains more than 10.5 percent wheat protein, the interior texture of the baked biscuit becomes bread-like, firm and tough. The crust is smooth without irregularities and leathery. The baked biscuits have a metallic, "canned biscuit" taste and the color is generally a deep foxy red.

The farinaceous material is preferably 100% soft wheat flour having a protein content within the specified limit. As used herein, soft wheat flour is one of two major classifications of flour. The classifications were made on the basis of their suitability for the manufacture of yeast-leavened breads.

"Hard . . . wheat flours contain a relatively high percentage of protein which forms a tenacious, elastic gluten of good gas-retaining properties and are capable of being baked into well-risen shapely loaves possessing good crumb grain and texture. They require a relatively large amount of water to make a dough of the proper consistency and hence give a high yield of bread. The doughs have excellent 'handling qualities' and are not critical in their mixing and fermentation requirements; for this reason, they will yield good bread over a relatively wide range of baking conditions and are said to have good fermentation tolerance. In contrast, 'soft' . . . flours have a relatively large amount of water to make a dough of the proper consistency and poor gas-retaining properties. They have relatively low water-absorbing capacity, yield doughs of inferior 'handling quality' which give trouble in machine baking; and are very critical in their mixing and fermentation requirements so that they are more likely to give baking failures. Weak flours require less mixing and fermentation than strong flours to give optimum baking results." *The Chemistry and Technology of Food and Food Products*, Morris B. Jacobs, Ed.; 2nd ed. (1951), p. 1,096.

However, the protein content of soft wheat flour varies from crop year to crop year and may range from 7 to 10.5 percent. Therefore, in crop years when the protein content is below the specified level, the soft wheat flour must be fortified from other protein sources. Protein-rich soft wheat flour is preferred for enriching the protein deficient soft wheat flour. One method of obtaining protein-rich soft wheat flour is by air classification as described in U.S. Pat. Nos. 3,077,308 and 3,077,407. Products containing from about 10 to 80 percent protein can be obtained by this process. Less preferred materials for fortifying the primary soft wheat component are hard wheat flour and vital wheat gluten.

Shortening

The total shortening content of this biscuit dough should range from 12 parts to 21 parts, preferably 16 parts to 20 parts, by weight. If less than 12 parts shortening are used herein, the outer surface of the baked biscuit becomes smooth as contrasted with the desired irregular, pocked surface and the crust is leathery. The biscuits have a dense crumb structure and the texture becomes more bread-like than cake-like. If more than 21 parts shortening are used herein, the baked biscuits have less volume and the biscuits spread outwardly during baking creating a fried appearance.

Within the general limits of total shortening content, it has been found that from 6 parts to 11 parts and preferably 7 parts to 9 parts plastic shortening should be used. If more plastic shortening is used in this biscuit dough, the interior texture becomes soggy and doughy. The crumb is translucent and dense and the baked product feels pasty in the mouth.

Plastic shortening, as used herein, refers to fats or mixtures of fats of such consistency that they may be readily spread, mixed, or worked. This class of fat products consists largely of lard and the vegetable or animal and vegetable products of lardlike consistency which have come to be known as shortenings. Also included in this definition are butter and margarine, which are not pure fats, but mixtures or emulsions of a fat and an aqueous liquid. Excluded from the classification are the so-called hard butters used in confectionery.

The plastic shortenings used herein should have a solids content at 60° F. between about 10 and 35 percent solids, preferably between 13 and 32.5 percent solids. The shortening should be sufficiently melted in the temperature range between 100° and 120° F. to prevent a waxy mouthfeel in the baked biscuit. Although it is preferred that the solids content of the shortening be 0 percent in this temperature range, shortenings having minor solids contents at temperatures above 120° F. can be used. These shortenings are usually blends containing several different shortenings each having a separate melting point. Highly preferred shortenings for use herein are hydrogenated soy and cottonseed oils.

The plastic shortenings can also be generally characterized by the slope of the solids fat index (SFI) curve in per cent solids per °F. The SFI curve for most plastic shortenings is essentially a straight line. Therefore, the slope as used herein is the best straight line drawn through the measured points. Solids content is usually measured at 50°, 70°, 92°, and 104° F. The slope of the SFI curve for these plastic shortenings generally ranges between −0.20 at 10 percent solids and 60° F. and −0.70 at 35 percent solids and 60° F. and, preferably between −0.30 at 13 percent solids and 60° F. and −0.65 at 32.5 percent and 60° F.

From about 6 parts to 12 parts, preferably from 8 parts to 10 parts, shortening chips should be used in addition to the plastic shortening. If more chips are used in this biscuit dough, the sidewall break is considerably reduced and the crust color of the biscuits is a dark foxy red.

The chips should have a thickness between about 1/32 inch and 1/16 inch and may have a diameter of ½ inch to several inches. During the mixing process, the larger chips will be broken into particles having a diameter of approximately ½ inch.

The shortening chips, like the plastic shortening, should be sufficiently melted in the temperature range between 100° and 120° F. to prevent a waxy mouthfeel in the baked product. Again minor amounts of solid shortening above a temperature of 120° F. can be tolerated if the solid shortening does not introduce a waxy mouthfeel in the baked product.

These chips should have a solids content at 60° F. of 55 percent or more if mixing is carried out at normal mixing temperatures ranging from 55° to 72° F. to prevent "greasing" the chips on the flour and insure that the chips will be relatively intact in the dough product. If the temperature of the mixing operation is decreased, the solids content of the chip at 60° F. can decrease accordingly. Conversely, if higher mixing temperatures are used, a higher solids content is required to prevent greasing of the flour unless, of course, the chips are refrigerated prior to mixing. Hydrogenated vegetable oils, such as soy and cottonseed, are preferred for use herein. However, other vegetable and animal fats meeting the above criteria can be used herein.

Water

The biscuit dough of this invention should contain sufficient water to provide a machinable dough; that is, a dough that can be processed, cut and packed on commercial equipment. The amount of water required will be affected by the absorption of the flour and the presence or absence of minor components. For example, additional water would be required if gums were added to the biscuit formulation. However, in ordinary biscuit formulations sufficient water is added to provide a farinaceous material-to-water ratio of from 1.6 to 2.0, preferably from 1.7 to 1.9. The ratio of farinaceous material to water, absent gums or other materials which tie up large quantities of water, importantly affects the maximum and minimum Farinograph readings for biscuit dough as well as the resistance to extension and the extensibility of the dough as measured by the Extensigraph. Within the range above described, the dough can be sufficiently developed to provide a dough that is machinable and which can be utilized to seal the refrigerated dough container.

Obviously, milk, buttermilk or other similar aqueous solutions can be utilized in place of the water above specified because these solutions are primarily water.

Leavening

In addition to the above components, sufficient chemical leavening should be used in this biscuit dough to provide a positive gas pressure in the sealed refrigerated dough container for at least 45 days. In addition, enough dissolved carbon dioxide and gaseous carbon dioxide must remain in the dough to function as a leavening agent during baking. Edible chemical leavening compositions suitable for use herein include those conventionally employed in chemically leavened baking mixes. These leavening compositions normally consist essentially of a leavening base and a leavening acid. Conventionally, an alkaline bicarbonate of baking grade such as sodium bicarbonate and potassium bicarbonate and one or more of the edible leavening acids are used for this purpose. Illustrative acids suitable for use in these biscuits include glucono delta lactone, sodium acid pyrophosphate, sodium aluminum phosphate hydrate, sodium aluminum phosphate anhydride and hydrous monocalcium phosphate, monocalcium phosphate monohydrate, monosodium phosphate, alpha-glucoheptono-gamma-lactone, mixtures thereof and the like. Several of these acids can be controlled during manufacture to provide relatively slow or relatively fast reaction rates.

The chemical leavening should have a relatively slow rate of reaction at normal processing temperatures to prevent large volume increases in the dough on the processing line. The leavening generally comprises from about 1.5 parts to about 3.5 parts by weight.

Preferred for use herein is a mixture of about 75 percent sodium acid pyrophosphate and 25 percent sodium aluminum phosphate (slow acting) as leavening acids and sodium bicarbonate as a leavening base. Generally, this leavening comprises about 2.5 parts of the total biscuit dough.

Other Components

In addition to the wheat protein specified as a portion of the farinaceous material, additional protein, such as milk protein, egg albumin, cottonseed protein and soy protein, can be added to the formulation. However, these protein sources are not a significant aid in functionally fortifying protein deficient soft wheat flour and all of these sources of protein are more expensive than wheat gluten. Additionally, cottonseed protein introduces color negatives and both cottonseed and soy protein introduce objectionable flavors. However, milk proteins generally improve the flavor of the product, improve the nutritional value of the product, and have a positive affect on shelf life. Illustrative milk solids suitable for use herein are sodium and calcium caseinate, lactalbumin, albumin, nonfat dry milk, buttermilk solids and whey solids. Nonfat dry milk and buttermilk solids are preferred for use herein and are generally used in amounts ranging from 0 parts to 5 parts by weight.

Salt and sugars are generally included in the product formulation to improve flavor. Additionally, these components may increase stability of the product by reducing the available water. Salt can be used herein in amounts from 0 to 2 parts by weight while sugar can be used in amounts ranging from 0 to 4 parts by weight. Additional sugar can be added to the biscuit formulation if a sweet biscuit or scone is the desired product.

Potassium sorbate can also be added to the formula as a dough conditioner. The potassium sorbate apparently decreases mixing time and apparently increases the storage stability of the dough product (see U.S. Pat. No. 3,556,798).

Additional components in minor amounts can include flavor and color agents, nutrient supplements, preservatives, anti-oxidants, and reducing agents.

Processing

Although the above components can be combined in a number of ways, the preferred method is to first combine the shortening, flour and water. A portion of the water is introduced into a dough mixer as ice. The plastic shortening is melted and sprayed into the ice simultaneously with the remainder of the water. The melted shortening, of course, solidifies on contact with the water and ice mixture. The shortening chips, followed by the flour, are then added to this mixture and it is minimally mixed. For example, the mixture may be mixed at a speed of 32 rpm for ½ minute to prevent dusting and then mixed at about 64 to 74 rpm for 3 minutes. It is preferred that the mixer be jacketed to maintain the dough temperature at about 60° F. during mixing. If a lower mixing temperature is used, chips with a lower solids content can be used without greasing the chips into the flour.

The other dry components including leavening, sugar, salt and milk solids can then be added to the mixer and combined into the dough. Again, the mixture should be minimally mixed, for example, ½ minute at 32 rpm and 3 minutes at 64 to 74 rpm. This mixing process is generally referred to as two-stage mixing. In one-stage mixing, all of the dry ingredients are added simultaneously with the flour.

The dough, after mixing, is then extruded onto a moving belt in a continuous dough sheet about 4 inches thick. The dough is reduced to about five-eighths inch by passing it through a roll stand or sheeting roll and, in a commerical operation, formed into a second dough sheet containing at least 4 layers. It is preferred that the final product contain from 8 to 12 layers. The layered dough sheet is then passed through a second roll stand or sheeting roll and reduced to about five-eighths inch in thickness. The dough sheet can then be cut in biscuit-size portions and packed using standard equipment. In most cases, the packaged dough product is proofed, prior to refrigerated storage, at temperatures ranging from about 70° to 100° F. to allow the leavening to react and pressurize the dough container.

It is important that the dough product be layered prior to baking to attain the best physical appearance. Such layered products exhibit vertical sidewalls and flat tops. Storage stability is also apparently increased by layering the dough prior to packing.

The term "standard biscuit size", as used herein, refers to a biscuit which is 2¼ inches in diameter and ⅝ inch thick. These dough pieces should weigh between 31 and 35 grams.

Because the dough is short and nonextensible, it must be continually supported throughout the processing operation. Special care must be exercised in all of these processing operations to prevent tearing the dough sheet.

The biscuit dough must be short and essentially nonextensible to provide a baked biscuit having a crumbly, friable texture with no visible striations. Accurate predictors of this preferred texture are Farinograph and Extensigraph values obtained on fresh dough containing the above components and processed as discussed above.

In order to conduct these tests, a Farinograph is equipped with a sigma blade and a mixing bowl and adjusted to 60° F. A dough sample is obtained from the mixer and allowed to relax for 5 minutes at room temperature. A 480-gram sample of dough is placed in the Farinograph bowl and the Farinograph is started. Dough consistency or viscosity in Brabender Units (meter-gram) is measured on the abscissa and time in minutes to peak development is measured on the ordinate. A minimum consistency is first obtained, and after full development of the dough, a maximum consistency value is obtained. The Farinograph values are influenced by total gluten protein content of the dough, the farinaceous material/water ratio and the work expended during mixing, and to a lesser extent, the amount and type of shortening in the dough.

Specifically, the dough, after mixing, should have a $\Delta BU/BU_{Max}$ of between 0.2 and 0.45, preferably 0.25 and 0.35. As used herein, $BU_{Max}$ is a Farinograph measurement of the maximum dough consistency in Brabender Units. $\Delta BU$ is the difference between the maximum dough consistency and the minimum dough consistency as measured on the Farinograph. For a general discussion of Farinographs, their operation and uses, see *The Farinograph Handbook*, Locken, et al., (Ed.), published by American Association of Cereal Chemists, Inc. (1972).

The other important measurements or predictors are resistance to extension measured in Brabender Units and extensibility measured in millimeters using the dough obtained after mixing. These tests are preferably conducted on an Extensigraph such as manufactured by C. W. Brabender Instruments and according to A.A.C.C. Method 54-10 modified as follows to test dough characteristics. The fermentation cabinet of the Extensigraph is maintained at 60° F. A sample of dough is taken from the mixer and allowed to relax at room temperature. A 150-gram sample of the dough is lightly dusted with flour and transferred to the rounder-homogenizer of the Extensigraph for 20 revolutions. The round dough ball is then molded into a cylinder, placed in the dough holder and placed in the fermentation cabinet for 15 minutes. The dough sample is then placed on the Extensigraph in position for stretching and the hook is pulled through the dough cylinder. The resistance to extension is measured in Brabender Units (BU) and the total extensibility of the dough is measured in millimeters.

For use herein, the dough should have a maximum resistance to extension of less than 1,000 BU and a maximum extension of less than 100 mm. Preferably, the maximum resistance to extension should be less than 800 BU and the maximum extension should be less than 80 mm.

Baked Characteristics

The biscuit dough of this invention when packed in refrigerated dough containers must be storage stable under refrigerated storage conditions (32° to 50° F., preferably 32° to 40° F.) for at least 45 days and preferably at least 60 days. To maintain storage stability for this period of time, a positive internal pressure must exist in the dough container. As a test for stability, the biscuit dough, when baked under optimum conditions, should exhibit the attributes below so that these biscuits will closely resemble homemade rolled biscuits. Optimum baking conditions for the formulations claimed herein generally require an oven temperature of about 400° F. and a baking time of from 10 to 13 minutes. It is, of course, understood that the temperature and baking time may vary due to changes in amounts of minor components, changes in altitudes, and individual tastes.

In order to meet the requirement of being storage stable for 45 days, the biscuit dough, when baked after storage for this time period, must produce a biscuit having a physical appearance, texture and taste closely resembling those attributes of homemade biscuits. The physical appearance can be measured by three objective tests: specific volume, height-to-spread ratio, and humping score; and three subjective tests: general appearance, sidewall break, and crust color. Texture and taste, and to a lesser degree, physical appearance, are measured by a subjective test—hot eating quality. Interior texture is measured separately and flavor is measured separately by subjective tests. All of these tests are preferably made with biscuits baked from a standard dough piece as hereinbefore defined. It is especially critical to use the standard dough piece in calculating the height-to-spread ratio.

The specific volume of the baked biscuit is the volume in cubic centimeters occupied by 1 gram of product. The specific volume may be determined as follows: The baked product is removed from the pan after baking, cooled for 1 hour and weighed. Several weighed biscuits are placed in a special layer cake pan and rape seeds are poured over the product. The rape seeds are then leveled with the top of the pan and the pan, product and seeds are weighed. Knowing these two weights, the specific volume can then be read from an appropriate nomograph. Specific volume can also be determined by other conventional methods.

The specific volume is an indicator of the relative lightness and fluffiness of the baked biscuits. Biscuits having a specific volume of less than 3.0 cubic centimeters per gram have been found to be unacceptable in comparison to a homemade biscuit. Therefore, the specific volume of the biscuits of this invention must be greater than 3.0 cc/gm.

The height-to-spread ratio is another important characteristic of the biscuits of this invention. To determine the height-to-spread ratio, six cooled biscuits are aligned side by side to determine the total spread, i.e., the sum of the biscuit diameters. Because the biscuits are frequently not round, an average of two or three measurements are taken. These same biscuits are then stacked and the total height of the stack is determined. The height is then divided by the spread. In order to obtain comparative figures, dough pieces of the same size must be used. For purposes of these tests, a standard dough piece 2¼ inches in diameter and ⅝ inch thick is used.

Biscuits that are erect, with essentially vertical sidewalls, exhibit a height-to-spread ratio of greater than 0.5. Height-to-spread ratios of less than 0.5 are unacceptable and usually indicate a flat, unappealing biscuit with bulging barrel-shaped sidewalls.

Another important attribute of these biscuits is that they have vertical sidewalls and flat tops. The presence of a humped or domed top surface is detrimental to the "homemade" physical appearance. Accordingly, an objective test for humping was designed using a scale from 0 to 3. A score of 0 indicates an essentially flat top while a score of 3 indicates maximum humping. In this test, the height of the sidewall is measured at three places on the circumference and averaged. A height measurement is also taken at the center of the biscuit. The difference between the average height of the sidewall and the height at the center of the biscuit must be less than 6 mm. to attain a humping score of 0 or 1 and to be acceptable. Such an acceptable score also generally indicates an acceptable sidewall break. Humping scores of 2 to 3, on the other hand, generally indicate that the sidewall is sealed and cracks appear in the top surface of many of the biscuits.

The general appearance of these biscuits is subjectively rated on a scale of 1 to 10. A score of 10 indicates general appearance equal to homemade biscuits while a score of 1 indicates very poor resemblance to homemade biscuits. To be acceptable on this scale, a score of 6 must be obtained.

The graders, in scoring biscuits for general appearance, subjectively measure the general profile of the biscuit, erectness of the biscuit and the flatness of the top. The sidewall should have a web-like break formed therein and the sidewall and top should be separated by a distinct edge. The top crust should be flakey, have an irregular, pocked configuration and be a mottled, golden brown color.

The sidewall break may be subjectively rated on a scale of 0 to 5 to help delineate acceptable physical appearance. A score of 5 indicates that the break is web-like and extends around about two-thirds of the circumference of the biscuit. A score of 0 indicates that the sidewall is sealed. A score of 3 is acceptable and indicates multiple breaks or a single break extending around about one-half of the circumference of the biscuit. However, the break is quite superficial and is generally quite straight.

The crust color of the baked biscuits can also be separately subjectively graded to determine acceptable physical appearance. The color should generally be a light golden brown or a light foxy red. Dark colors are generally to be avoided and golden brown tones are preferred over the redder tones.

Texture and taste of hot biscuits is subjectively measured by a test for hot eating quality. Each biscuit is scored on a scale of 0 to 10. A score of 10 indicates that the texture and taste are indistinguishable from homemade, that is; the texture is coarse grained, crumbly and friable and the taste is bland with no metallic or "canned biscuit" flavor. A score of 0 indicates that the biscuits are totally unacceptable in both taste and texture. A score of 6, on this scale, denotes a biscuit that is acceptable. When grading biscuits according to this test, biscuits are eaten while warm from the oven.

The interior texture is also measurable subjectively on a scale of 0 to 10. After the biscuit is thoroughly cooled, a corner is sliced off. The grader subjectively tests the compressibility and elasticity of the crumb and the general friability or crumbliness of the crumb. A score of 10 indicates a tender, friable homemade quality while a score of 0 indicates a tough, noncompressible crumb structure. A score of 6 or higher denotes acceptable biscuits.

Flavor is also subjectively graded on a scale of 0 to 10. However, because the flavor of biscuits is quite bland, it generally is difficult to separate formulations solely on a flavor basis. The flavor tests become merely a check for such noticeable and disagreeable flavors as introduced by relatively large amounts of soy protein.

Many tests have been outlined above to compare the physical appearance, texture and taste of the biscuits of this invention with those attributes of homemade biscuits. The objective tests are, of course, more reliable and more significant. For that reason, the biscuits of this invention must be within the claimed limits for the measurements of $\Delta BU/BU_{Max}$, maximum extension in millimeters, maximum resistance to extension, specific volume, and height-to-spread ratio and humping criteria. It is highly preferred that the biscuits of this invention meet the subjective tests for sidewall break, general appearance and hot eating quality. The subjective tests for internal texture, flavor and crust color are of lesser importance.

EXAMPLES

The following runs are illustrative of a series of test formulations. In each run, 25,000 gram samples of biscuit dough were prepared according to the formulations of Table 1, packed in refrigerated dough containers, and stored at 40° F. for 49 days. At the end of that storage period, the dough containers were opened and the biscuits were baked and evaluated.

TABLE 1

| COMPONENTS | RUN 1 | RUN 2 | RUN 3 | RUN 4 | RUN 5 | RUN 6 | RUN 7 | RUN 8 | RUN 9 | RUN 10 |
|---|---|---|---|---|---|---|---|---|---|---|
| (Parts By Weight) | | | | | | | | | | |
| Total flour | 46.038 | 44.521 | 46.345 | 43.974 | 48.626 | 46.153 | 47.746 | 45.938 | 43.493 | 49.886 |
| Flour - hard wheat | — | — | — | 4.062 | 13.893 | — | 31.847 | — | — | — |
| Flour - soft wheat | 40.179 | 38.855 | 44.629 | 37.692 | 34.733 | 46.153 | 15.899 | 40.179 | 37.957 | 46.172 |
| Air classified soft wheat flour | 5.859 | 5.666 | 1.716 | 2.220 | — | — | — | 5.859 | 5.536 | 3.694 |
| Total protein % | 10.0 | 10.0 | 9.0 | 9.5 | 9.5 | 8.4 | 10.75 | 10.0 | 10.0 | 9.5 |
| Total shortening | 18.000 | 18.000 | 18.000 | 18.000 | 18.000 | 18.000 | 18.000 | 18.000 | 22.000 | 10.000 |
| Shortening chips | 8.000 | 8.000 | 8.000 | 8.000 | 8.000 | 8.000 | 8.000 | 4.000 | 10.000 | 6.600 |
| Shortening plastic | 10.000 | 10.000 | 10.000 | 10.000 | 10.000 | 10.000 | 10.000 | 14.000 | 12.000 | 3.400 |
| Shortening SFI slope | −0.65 | −0.65 | −0.65 | −0.30 | −0.65 | −0.65 | −0.65 | −0.30 | −0.30 | −0.65 |
| Water | 26.308 | 27.825 | 25.744 | 28.371 | 23.700 | 25.929 | 24.600 | 26.308 | 24.853 | 30.480 |
| Flour/Water ratio | 1.75 | 1.60 | 1.72 | 1.55 | 2.05 | 1.78 | 1.94 | 1.75 | 1.75 | 1.64 |
| SALP | 0.350 | 0.350 | 0.350 | 0.350 | 0.350 | 0.350 | 0.350 | 0.350 | 0.350 | 0.350 |
| SAPP | 0.954 | 0.954 | 0.954 | 0.954 | 0.954 | 0.954 | 0.954 | 0.954 | 0.954 | 0.954 |
| Soda | 1.050 | 1.050 | 1.050 | 1.050 | 1.050 | 1.050 | 1.050 | 1.050 | 1.050 | 1.050 |
| Salt | 1.200 | 1.200 | 1.200 | 1.200 | 1.200 | 1.200 | 1.200 | 1.200 | 1.200 | 1.200 |
| Sugar | 3.000 | 3.000 | 3.000 | 3.000 | 3.000 | 3.000 | 3.000 | 3.000 | 3.000 | 3.000 |
| Nonfat Dry Milk | 3.000 | 3.000 | 3.000 | 3.000 | 3.000 | 3.000 | 3.000 | 3.000 | 3.000 | 3.000 |
| Potassium sorbate | 0.100 | 0.100 | 0.100 | 0.100 | 0.100 | 0.100 | 0.100 | 0.100 | 0.100 | 0.100 |

The farinaceous materials used in these runs had a moisture content of about 14 percent. The protein content, however, varied considerably. The soft wheat flour contained 8.4 percent protein, the hard wheat flour contained 11.7 percent protein, and the air classified soft wheat flour contained 20 percent protein. All of the protein was, of course, wheat protein and the wheat protein was primarily gluten.

The shortening chips used herein were 100% hydrogenated soy oil having a Wiley melting point of 111° ± 2° F. The solids fat index was as follows:

| TEMPERATURE | % SOLIDS |
|---|---|
| 50° F. | 65 ± 3 |
| 70° F. | 57 ± 3 |
| 80° F. | 53 ± 3 |
| 92° F. | 36 ± 3 |
| 104° F. | 13 maximum |

The chip thickness was 0.026 inch and the diameter was approximately one-half inch. The chips were neither flavored nor colored.

Two plastic shortenings were used herein both of which were emulsified hydrogenated soy oils. The first shortening having an SFI slope of −0.65, had a Wiley melting point of 106° ± 3° F. and a solids fat index as follows:

| TEMPERATURE | % SOLIDS |
|---|---|
| 50° F. | 39 ± 3 |
| 70° F. | 26 ± 3 |
| 80° F. | 20 ± 3 |
| 92° F. | 11 ± 2.5 |
| 100° F. | 5 ± 2.0 |
| 110° F. | 0 ± 1.5 |

The second shortening having an SFI slope of −0.30 had a Wiley melting point of 115° ± 2° F. and a solids fat index as follows:

| TEMPERATURE | % SOLIDS |
|---|---|
| 50° F. | 26 ± 3 |
| 70° F. | 20 ± 3 |
| 92° F. | 14 ± 2 |
| 104° F. | 10 ± 2 |

The leavening system used herein comprised sodium acid pyrophosphate (SAPP), sodium aluminum phosphate (SALP) and powdered bicarbonate of soda. SAPP has been used as a leavening acid in refrigerated doughs for many years. The rate of reaction of SAPP and SALP with the leavening base can be controlled by the manufacturer's processing methods. Both the SAPP and SALP used herein are relatively slow reacting.

The sugar used herein was granulated sucrose. The nonfat dry milk solids were in powdered form and had a fat content of 1.25 percent or less.

About one-third of the total water was added to a water-jacketed mixer as ice. The coolant circulating through the jacket was maintained at a temperature about 22° F. to maintain the dough temperature during mixing at about 58° F. The plastic shortening was melted and sprayed into the mixer with the remainder of the water. The melted shortening, of course, solidified on contact with the ice and water. The shortening chips were added to the mixer followed by the farinaceous material in Runs 1 and 3–10 and mixed first at a slow speed (32 rpm) and then at a fast speed (74 rpm) for the times indicated in Table 2. In these runs, the remainder of the dry ingredients were added and, in this second stage, mixed at a slow speed and then at a fast speed. In Run 2, all of the dry ingredients were added simultaneously with the farinaceous material and mixed in a single stage for the times indicated in Table 2.

The dough was then removed from the mixer and reduced to a continuous dough sheet about five-eighths inch in thickness by passing it through a sheeting roll. The dough was then folded upon itself to form three layers, passed through a sheeting roll, and again folded to form three layers and sheeted to reduce it to about five-eighths inch in thickness. The final dough sheet therefore contained nine layers. Hexagonal dough pieces 2¼ inches in diameter and weighing about 33 grams, were cut from the dough sheet and packed in fiber, refrigerated dough containers and stored at 40° F.

A portion of the dough, after mixing, was used to obtain Farinograph and Extensigraph values as indicated in Table 2.

After 49 days stored at 40° F., the refrigerated dough containers were opened and the biscuits were baked on cookie sheets at 400° F. for about 13 minutes. The baked biscuits were graded by home economists for specific volume, height-to-spread ratio, humping, general appearance, sidewall break, hot eating quality, interior texture and flavor based on the tests described hereinbefore. The results of this grading are set forth in Table 2.

TABLE 2

|  | RUN 1 | RUN 2 | RUN 3 | RUN 4 | RUN 5 | RUN 6 | RUN 7 | RUN 8 | RUN 9 | RUN 10 |
|---|---|---|---|---|---|---|---|---|---|---|
| Mixing (minutes) | | | | | | | | | | |
| First Stage | ½–1½ | ½–6 | ½–1½ | ½–1½ | ½–1½ | ½–4½ | ½–1½ | ½–1½ | ½–1 | ½–1½ |
| Second Stage | ½–3 | | ½–2½ | ½–2½ | ½–2½ | ½–2½ | ½–2½ | ¼–4 | ½–2 | ½–2 |
| Can Pressure (psi) | 33 | 34 | 32 | 23 | 13 | 30 | 31 | 6 | 28 | 25 |
| Farinograph | | | | | | | | | | |
| $BU/BU_{Max}$ | 0.267 | 0.435 | 0.29 | 0.57 | 0.16 | 0.12 | 0.145 | 0.53 | 0.22 | 0.29 |
| Extensigraph | | | | | | | | | | |
| Maximum Resistance (BU) | 925 | 515 | 620 | TOO | 1000+ | 745 | 1000+ | TOO | 530 | 620 |
| Extensigraph | | | | | | | | | | |
| Maximum Extension (mm) | 82 | 50 | 65 | WET | 81 | 82 | 80 | WET | 41 | 92 |
| Specific Volume (cc/gm) | 3.57 | 3.41 | 3.27 | 3.23 | 2.36 | 2.62 | 3.18 | 2.70 | 2.87 | 3.77 |
| Height-to-spread Ratio | 0.58 | 0.56 | 0.54 | 0.44 | 0.45 | 0.43 | 0.55 | 0.45 | 0.48 | 0.51 |
| General Appearance | 6 | 8 | 7 | 3 | 1 | 3 | 5 | 2 | 3 | 5 |
| Humping | 1 | 0 | 0 | 2 | 2 | 2 | 2 | 2 | 2 | 1 |
| Hot Eating Quality | 8 | 7 | 6 | 7 | 2 | 5 | 6 | 7 | 6 | 5 |
| Sidewall Break | 4 | 3 | 4 | 2 | 0 | 4 | 4 | 2 | 2 | 0 |
| Internal Texture | 7 | 7 | 6 | 7 | 1 | 2 | 3 | 6 | 6 | 9 |
| Flavor | 7 | 8 | 7 | 8 | 5 | 8 | 8 | 7 | 7 | 7 |

The biscuits of Runs 1–3 meet all of the criteria established for acceptable biscuits. The biscuits of Runs 4–10 were unacceptable and outside the limits of this invention. The biscuits of Runs 5–7 are over-developed as indicated by the $\Delta BU/BU_{Max}$ score and all have insufficient specific volume. Additionally, they are flat and humped as indicated by both the height-to-spread ratio and humping score. The biscuits of Runs 4 and 8 were too wet (contained too much water) to obtain Extensigraph readings and, accordingly, were difficult to commercially process. Additionally, these biscuits are flat and humped as indicated by both the height-to-spread ratio and humping score. The biscuits of Runs 9 had insufficient specific volume and were flat and humped. The biscuits of Run 10 had no sidewall break and barely met the criteria for height-to-spread ratio and maximum extension. Additionally, the general appearance and hot eating quality scores are below minimum standards.

What is claimed is:

1. Fresh biscuit dough packed in refrigerated dough containers which is stable under refrigerated storage conditions for at least 45 days comprising, in parts by weight:
   a. from 43 parts to 53 parts of a farinaceous material containing from 8.5 to 10.5 percent wheat protein;
   b. from 12 parts to 21 parts shortening, said shortening comprising from 6 parts to 12 parts of shortening in discrete chip form and from 6 parts to 11 parts plastic shortening;
   c. water in an amount sufficient to provide a machinable dough;
   d. chemical leavening in an amount sufficient to expand the dough and provide a positive pressure in the refrigerated dough container;

said biscuit dough, after mixing but prior to packing, having an Extensigraph value for maximum resistance to extension of less than 1,000 Brabender Units and an Extensigraph value for maximum extension of less than 100 mm and having a $\Delta BU/BU_{Max}$ calculated from Farinograph data of 0.20 to 0.45 wherein $\Delta BU$ is the difference between the maximum Farinograph viscosity measurement in Brabender Units and the minimum Farinograph viscosity measurement in Brabender Units and $BU_{Max}$ is the maximum Farinograph viscosity measurement in Brabender Units.

2. The fresh biscuit dough of claim 1 containing from 16 parts to 20 parts of shortening.

3. The fresh biscuit dough of claim 2 wherein the plastic shortening comprises from 7 parts to 9 parts and the chip shortening comprises from 8 parts to 12 parts and wherein each of said shortening components is sufficiently melted in the temperature range between 100° and 120° F. to prevent a waxy mouthfeel in the baked product.

4. The fresh biscuit dough of claim 3 wherein the solids content of the plastic shortening at 60° F. is between 10 and 35 percent by volume fat solids and wherein the solids content of the chip shortening at 60° F. is greater than 55 percent by volume fat solids.

5. The fresh biscuit dough of claim 1 having a farinaceous material-to-water ratio of 1.6 to 2.0.

6. The fresh biscuit dough of claim 1 having an Extensigraph value for maximum resistance to extension of less than 800 Brabender Units and an Extensigraph value for maximum extension of less than 80 mm.

7. The fresh biscuit dough of claim 6 having a $\Delta BU/BU_{Max}$ of 0.25 to 0.35.

8. The fresh biscuit dough of claim 7 having a farinaceous material-to-water ratio of 1.7 to 1.9.

9. The fresh biscuit dough of claim 1 containing from 46 parts to 49 parts of farinaceous material having a wheat protein content of from 9 to 10 percent.

10. The fresh biscuit dough of claim 9 wherein the farinaceous material is soft wheat flour.

11. The fresh biscuit dough of claim 1 containing from 0 parts to 5 parts milk solids.

12. The fresh biscuit dough of claim 1 containing from 0 parts to 4 parts sugar.

13. The fresh biscuit dough of claim 1 containing from 0 parts to 2 parts salt.

14. The fresh biscuit dough of claim 1 which, when formed into biscuit-like dough pieces 2½ inches in diameter and ⅝ inch thick each containing at least 4 horizontal dough layers, and baked under optimum conditions, has a specific volume of greater than 3.0 cc/gm, a height-to-spread ratio of more than 0.5, and a humping value of less than 6 mm.

15. The fresh biscuit dough of claim 1 wherein said biscuit dough is formed into dough pieces having at least 4 dough layers prior to packing.

16. The fresh biscuit dough of claim 15 wherein, when said dough pieces are 2¼ inches in diameter and ⅝ inch thick, and when baked the baked biscuits have a specific volume of greater than 3.0 cc/gm, a height-to-spread ratio of more than 0.5, and a humping value of less than 6 mm.

17. The fresh biscuit dough of claim 16 wherein, when baked, the baked biscuits have a web-like break extending around a portion of the sidewall and wherein the internal texture is coarse-grained, crumbly and friable.

18. The fresh biscuit dough of claim 15 wherein the dough pieces have from 8 to 12 dough layers.

19. Fresh biscuit dough packed in refrigerated dough containers which is stable under refrigerated storage conditions for at least 45 days comprising:
   (a) from 43 parts to 53 parts of soft wheat flour containing from 8.5 to 10.5 percent wheat protein;
   (b) from 16 parts to 20 parts shortening, said shortening being sufficiently melted in the temperature range between 100° and 120° F. to prevent a waxy mouthfeel in the baked biscuit, said shortening comprising from 6 to 12 parts of shortening in discrete chip form having a solids content at 60° F. of greater than 55 percent by volume fat solids, and from 6 to 11 parts of plastic shortening having a solids content at 60° F. of from 10 to 35 percent by volume fat solids;
   (c) water in an amount sufficient to provide a flour-to-water ratio of from 1.7 to 1.9;
   (d) chemical leavening in an amount sufficient to expand the dough and provide a positive pressure in the refrigerated dough container;
   (e) from 0 parts to 5 parts milk solids;
   (f) from 0 parts to 2 parts salt;
   (g) from 0 parts to 4 parts sugar;

said biscuit dough, at termination of mixing but prior to packing, having an Extensigraph value for maximum resistance to extension of less than 800 Brabender Units and an Extensigraph value for maximum extension of less than 80 mm and having a $\Delta BU/BU_{Max}$ calculated from Farinograph data of 0.25 to 0.35 wherein $\Delta BU$ is the difference between the maximum Farinograph viscosity measurement in Brabender Units and the minimum Farinograph viscosity measurement in Brabender Units and $BU_{Max}$ is the maximum Farinograph viscosity measurement in Brabender Units.

20. The fresh biscuit dough of claim 19 wherein soft wheat flour comprises from 46 parts to 49 parts of said dough.

21. The fresh biscuit dough of claim 20 wherein the slope of the solids fat index curve for the plastic shortenings is between −0.20 at 10 percent by volume fat solids and 60° F. and −0.70 at 35 percent by volume fat solids and 60° F.

22. The fresh biscuit dough of claim 19 wherein said biscuit dough is formed into dough pieces having at least 4 dough layers prior to packing.

23. The fresh biscuit dough of claim 22 wherein, when said dough pieces are 2¼ inches in diameter and ⅝ inch thick, and when baked, the baked biscuits have a specific volume of greater than 3.0, a height-to-spread ratio of more than 0.5, and a humping value of less than 6 mm.

24. The fresh biscuit dough of claim 23 wherein, when baked the baked biscuits have a web-like break extending around a portion of the sidewall and wherein the internal texture is coarse-grained, crumbly and friable.

25. The fresh biscuit dough of claim 22 having from 8 to 12 dough layers.

26. Fresh biscuit dough formed into dough pieces each containing at least 4 layers and packed into refrigerated dough containers, said dough comprising:
 a. from 43 parts to 53 parts of a farinaceous material containing from 8.5 to 10.5 percent wheat protein;
 b. from 12 parts to 21 parts shortening, said shortening comprising from 6 parts to 12 parts of shortening in discrete chip form and from 6 parts to 11 parts plastic shortening, each of said shortening components being sufficiently melted in the temperature range between 100° and 120° F. to prevent a waxy mouthfeel in the baked product;
 (c) water in an amount sufficient to provide a machinable dough;
 (d) chemical leavening in an amount sufficient to expand the dough and provide a positive pressure in the refrigerated dough container;

wherein, when said biscuit dough pieces are baked within 45 days after manufacture, the baked biscuits have vertical sidewalls, flat tops, web-like breaks in the sidewall, a crumbly, friable internal texture, and a bland taste.

27. The fresh biscuit dough of claim 26 wherein the farinaceous material is soft wheat flour.

28. The fresh biscuit dough of claim 27 wherein the solids content of the plastic shortening at 60° F. is between 10 and 35 percent by volume fat solids and wherein the solids concentration of the chip shortening at 60° F. is greater than 55 percent by volume fat solids.

29. The fresh biscuit dough of claim 28 having, after mixing but prior to packing, an Extensigraph value for resistance to extension of less than 1,000 Brabender Units and an Extensigraph value for maximum extension of less than 100 mm.

30. The fresh biscuit dough of claim 29 having a $\Delta BU/BU_{Max}$ calculated from Farinograph data of 0.20 to 0.45 wherein $\Delta BU$ is the difference between the maximum Farinograph viscosity measurement in Brabender Units and the minimum Farinograph viscosity measurement in Brabender Units and $BU_{Max}$ is the maximum Farinograph viscosity measurement in Brabender Units.

31. The fresh biscuit dough of claim 30 having from 8 to 12 dough layers.

* * * * *